United States Patent [19]
Parks et al.

[11] Patent Number: 5,448,697
[45] Date of Patent: Sep. 5, 1995

[54] METHOD AND APPARATUS FOR SIMPLIFIED CONTROL OF A VIDEO MONITOR

[75] Inventors: Terry J. Parks, Round Rock; Joseph W. Bell, Jr., Austin, both of Tex.

[73] Assignee: Dell USA, L.P., Austin, Tex.

[21] Appl. No.: 119,937

[22] Filed: Sep. 10, 1993

[51] Int. Cl.$^6$ ............................................. G06F 15/00
[52] U.S. Cl. .................................................. 395/162
[58] Field of Search ............... 395/162, 164, 200, 275, 395/325, 375; 345/1, 2, 132, 156, 157, 163, 168, 154, 203, 112

[56] References Cited

U.S. PATENT DOCUMENTS

| | | | |
|---|---|---|---|
| 5,241,631 | 8/1993 | Smith et al. | 395/325 |
| 5,276,458 | 1/1994 | Sawdon | 345/132 |
| 5,287,460 | 2/1994 | Olsen et al. | 395/275 |

Primary Examiner—Mark R. Powell
Assistant Examiner—U. Chauhan
Attorney, Agent, or Firm—James Huffman

[57] ABSTRACT

A method and apparatus which provides bi-directional communication between a video monitor and a computer system unit. This enables the video monitor to inform the system unit of its capabilities without user involvement and also enables the system unit to directly control or adjust all the functions of the video monitor. In the preferred embodiment, a monitor/mouse interface provides bi-directional communication between the video monitor and the system unit. The monitor/mouse interface connects to the mouse and video connectors or the back of the system unit and in turn connects to the mouse and video monitor. The interface includes separate data paths from the system unit to the mouse and video monitor, respectively. Monitor control software is included in the system unit which can be used to control or adjust the output of the video monitor. When a user desires to adjust the output of the video monitor, the monitor control software directs the monitor/mouse interface to provide a communication path between the system unit and the video monitor, and the system unit relates the control information input from the user to the video monitor, which adjusts its visual output accordingly. Also, at each power-on of the computer system, the monitor/mouse interface selects the data path between the system unit and video monitor to enable the video monitor to provide capability information to the system unit. A second embodiment includes the monitor/mouse interface logic comprised in the video monitor.

26 Claims, 8 Drawing Sheets

METHOD AND APPARATUS FOR SIMPLIFIED CONTROL OF A VIDEO MONITOR

SPECIFICATION

1. Field of the Invention

The present invention relates to video monitors in computer systems, and more particularly to a method and apparatus of bi-directional communication between a video monitor and a computer system unit to allow simplified system control of video monitor functions and simplified monitoring of the video monitor's capabilities.

2. Description of the Related Art

A computer system essentially comprises a system unit housing a microprocessor, computer memory, and various other support logic, as well as various input-/output (I/O) devices which are connected to the system unit and enable a user to intelligently interact with the system unit. Examples of various types of input devices include a keyboard, a mouse, a trackball, and a pen computer, as well as others. The primary output devices in a computer system include a video display monitor (video monitor) and a printer.

For most users, the video monitor is the most important device in a computer system because it provides the output that the user actually sees. The video monitor provides the user with instant visual feedback and enables the computer to be interactive with the user. Current video monitors have many controls which vary the image or picture that is presented on the screen, including controls for such things as horizontal and vertical size, horizontal and vertical position, PCC (pin cushion control) amp and phase, key and pin balance, color balance, brightness and contrast, and power control. These controls are typically expensive and some are very difficult to use. In addition, these controls require non-volatile memory in the video monitor in order to remember the settings between power cycles. The requirement of non-volatile memory for these settings further adds to the cost of the monitor. Therefore, an improved method and apparatus is desired which provides communication between the computer system unit and the video monitor to allow simplified system control of monitor functions. It is also desirable that this method and apparatus not require any modification to system unit hardware.

There currently exist a number of different types of video monitors available for computer systems, including both monochrome and color monitors. Various types of color video monitors include composite color, RGB, enhanced RGB, VGA, and multiscanning or multisync monitors. In addition, a wide array of video display adapter standards are available, including CGA (color graphics adapter), EGA (enhanced graphics adapter), VGA (video graphics array), XGA (extended graphics array), and Super VGA, among others. In order for a video monitor to work properly with the display adapter standard being used in the respective system unit, it is important that the system unit know a certain amount of information about the monitor, including the capabilities such as resolution, refresh frequency, and interlace method that the monitor supports.

Resolution refers to the sharpness of a video image that appears on the screen. In graphics mode, a video screen is comprised of a number of individual picture elements (pixels) which may each be individually addressed and activated to form an image on the screen. Resolution refers to how many individual pixels can be resolved across the screen, i.e. resolution indicates the number of pixels comprising the screen. For example, a standard VGA display screen has a resolution of 640 horizontal pixels by 480 vertical pixels.

Another variable among computer video monitors is referred to as the refresh frequency. Essentially, a monitor must be able to synchronize to two synchronizing frequencies, these being the vertical frequency or refresh rate and the horizontal synchronizing frequency, referred to as the horizontal scan rate. The vertical frequency or refresh rate determines the rate at which the complete screen is updated. VGA and most other video standards use refresh rates between 60 and 70 Hz. The horizontal scan rate indicates the rate at which individual scan lines that make up the image are drawn. The frequency ranges that a monitor can handle essentially determine which video standards the video monitor can work with, and it is critical that the monitor be able to synchronize to the synchronizing frequencies used by a respective video adapter. For example, the CGA standard requires a horizontal frequency of 15.75 kHz, MDA requires 18 kHz, EGA requires 22 kHz, and VGA requires 31.5 kHz Also, with regard to resolutions used by the Super VGA standard, horizontal frequencies depend on the refresh rate or vertical frequency used. For example, at a 56 Hz refresh rate, a 35 kHz horizontal frequency is adequate. However, using the VESA (Video Electronic Standards Association) 72 Hz refresh rate specification, a 48 kHz horizontal frequency is required. The horizontal scan rate is typically determined from the refresh rate and the resolution, and thus the system unit does not need to receive capability information from the video monitor regarding the horizontal scan rate.

Another variable among video monitors is whether the monitor uses an interlaced method for generating individual scan lines on the computer video screen. An interlaced system operates such that, instead of scanning the image from top to bottom on the video screen one line after another, each frame of the image is broken in half into two fields. One field consists of odd numbered lines of the image, and the other consists of the even numbered lines of the image. The electron beam which creates the image on the screen sweeps across and down the screen illuminating every other line and then moves back to the top and finishes with the lines it missed on the first pass. This technique achieves an apparent doubling of the frame rate. Video monitors which do not perform interlacing merely sweep across and down the screen illuminating every line on the screen in one pass.

Due to the wide variety of different video monitors available, it is imperative that the computer system unit know which capabilities the monitor supports, such as the resolution, interlace method, and refresh frequency. Currently there is no way for the computer system unit to determine this information independently, and therefore current systems require the user to inform the system as to what kind of monitor is installed. This is both inconvenient for the user and, when erroneous information is provided, sometimes results in a sub optimal system/monitor interface. The standard established by VESA includes a proposal in which monitor capabilities are provided on a diskette which is shipped with each monitor. However, this is an inferior solution for several reasons. First, requiring a diskette containing monitor capabilities to be shipped with each monitor adds to the expense of the video monitor. In addition, requiring use of a diskette for monitor installation is inconvenient for the user. The diskette is prone to being lost after a first installation, thus making subsequent installations considerably more difficult. Therefore, a method and apparatus is desired which enables the video monitor to communicate capability and/or configuration information to the computer system unit without requiring user involvement. It is also desirable that such a method and apparatus not require any modification to system unit hardware.

SUMMARY OF THE INVENTION

The present invention comprises a method and apparatus which provides bi-directional communication between the video monitor and the system unit without modification to system unit hardware. This enables the video monitor to inform the system unit of its capabilities without direct user involvement and also enables the system unit to directly control all the functions of the video monitor.

In one embodiment of the invention, a monitor/mouse interface is provided to allow bi-directional communication between the video monitor and the system unit. The monitor/mouse interface comprises a housing including a microcontroller, a first video connector for connection to the system unit, a second video connector for connection to the video monitor, a serial mouse connector for connection to the mouse connector on the system unit, and a mouse connector for receiving a mouse. The monitor/mouse interface connects to the video and mouse connector on the back of the system unit and also connects to the video monitor and mouse. The monitor/mouse interface acts as a signal router, providing a first data path between the system unit and the mouse during normal operations and a second data path between the system unit and video monitor when monitor control or capability information retrieval is desired. In a second embodiment, the logic forming the monitor/mouse interface is incorporated into the video monitor.

Monitor control software is included in the system unit which is used to control or adjust the output of the video monitor. When a user desires to adjust the output of the video monitor, the monitor control software directs the monitor/mouse interface to provide a communication path between the system unit and the video monitor. The monitor control software also generates a user interface on the video monitor that enables a user to easily adjust the operation of the monitor. The system unit relates the monitor control data input from the user through the monitor/mouse interface to the video monitor, which adjusts its visual output accordingly. Therefore, no separate controls on the video monitor are required. Also, no non-volatile memory is required in the video monitor, but rather the settings are preferably stored in the CMOS memory inside the computer system. Also, at each power-on of the computer system, the monitor/mouse interface is directed to select the data path between the system unit and video monitor to enable the video monitor to provide capability information to the system unit such as resolution, interface method, and refresh frequency. Thus, this information is automatically provided to the system unit without direct user involvement.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
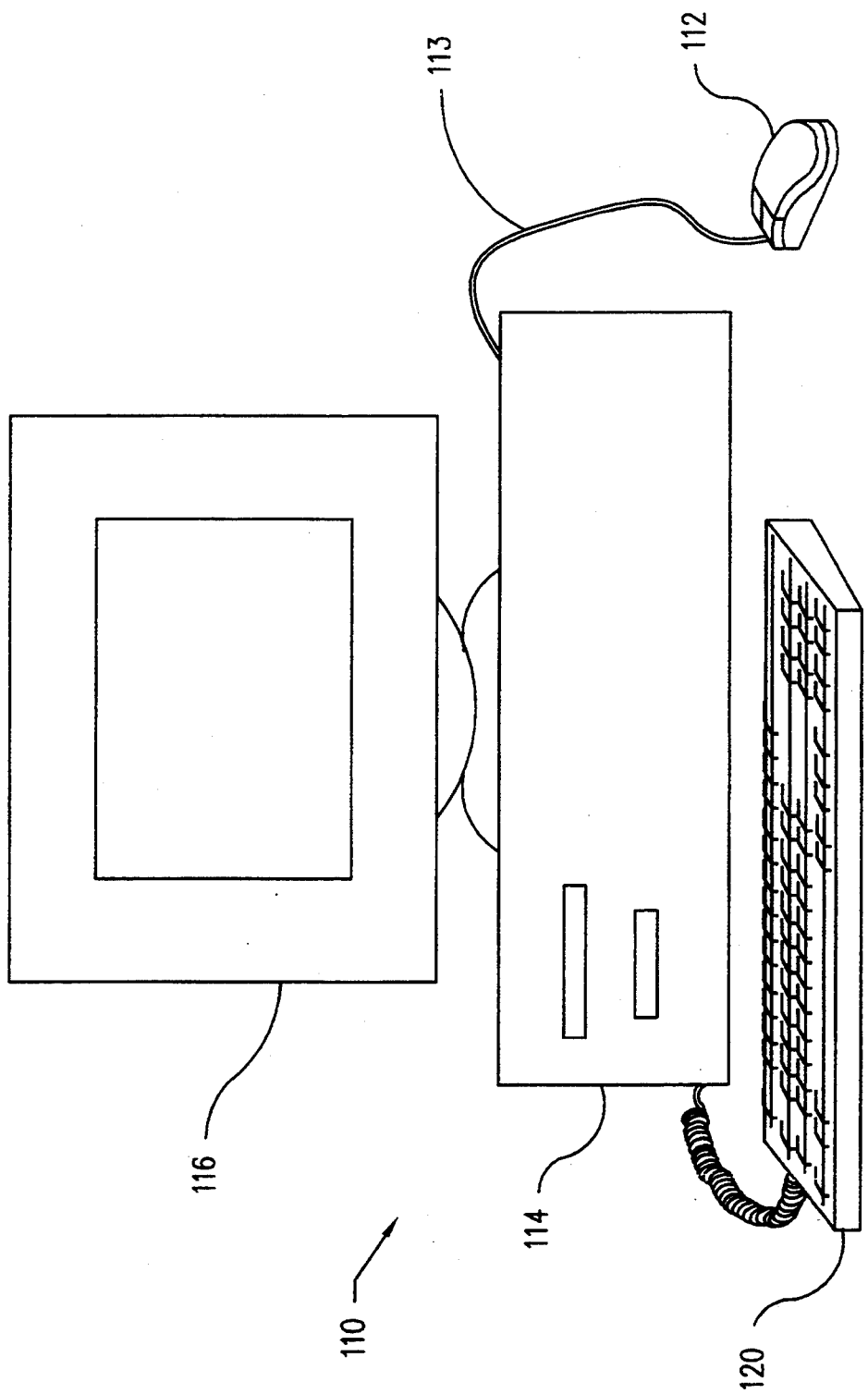
FIG. 1 is a front view of a computer system.
Figure 1A:
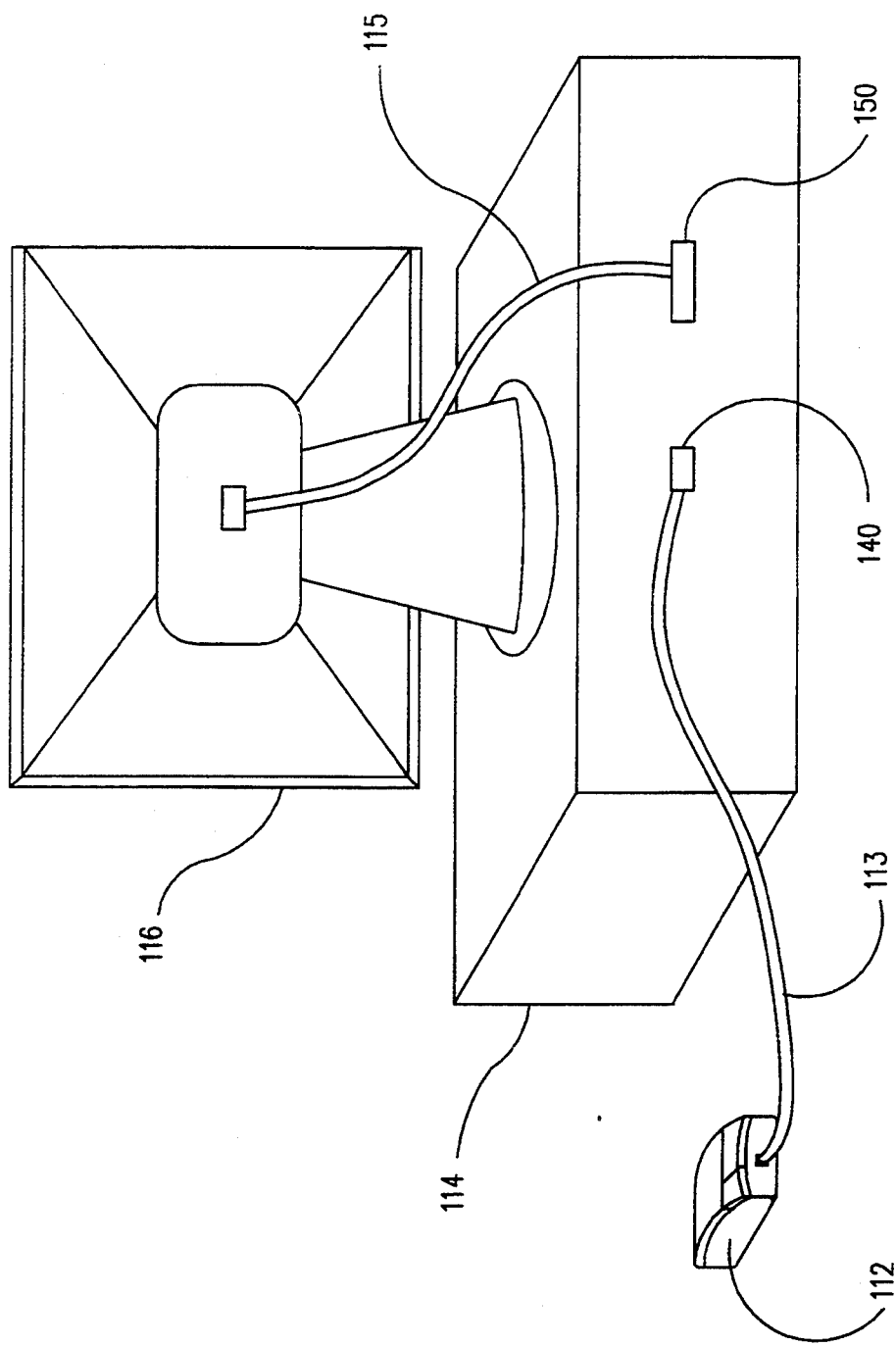
FIG. 1A is a back view of the computer system of FIG. 1 wherein a monitor/mouse interface according to the present invention is not connected.

Referring now to FIG. 1, a computer system 110 is shown. The computer system 110 includes a system unit 114, a video monitor 116 connected to the system unit 114, a pointing device or mouse 112 connected to the system unit 114 through a cable 113, and also a keyboard 120 preferably connected to the system unit 114. FIG. 1A is a back view of the computer system of FIG. 1. In FIG. 1A, the back of the computer system is configured as in the prior art and does not include a monitor/mouse interface according to the present invention. A monitor/mouse interface is not attached in this figure to allow viewing of the back of the system unit 114. As shown, the system unit 114 includes a system unit mouse connector 140 and a system unit video connector 150. The phrases "mouse connector" and "video connector" are written on the back of the system unit 114 underneath the mouse connector 140 and the video connector 150, respectively, for convenience. The video connector 150 is connected to the video monitor 116 by means of a video cable 114, and the mouse 112 is connected to the mouse connector 140 by means of mouse cable 113. As described below, the preferred embodiment of the invention contemplates a monitor/mouse interface connected to the mouse and video connectors 140 and 150 and having further connectors for connecting to the monitor 116 and mouse 112.

Figure 2:
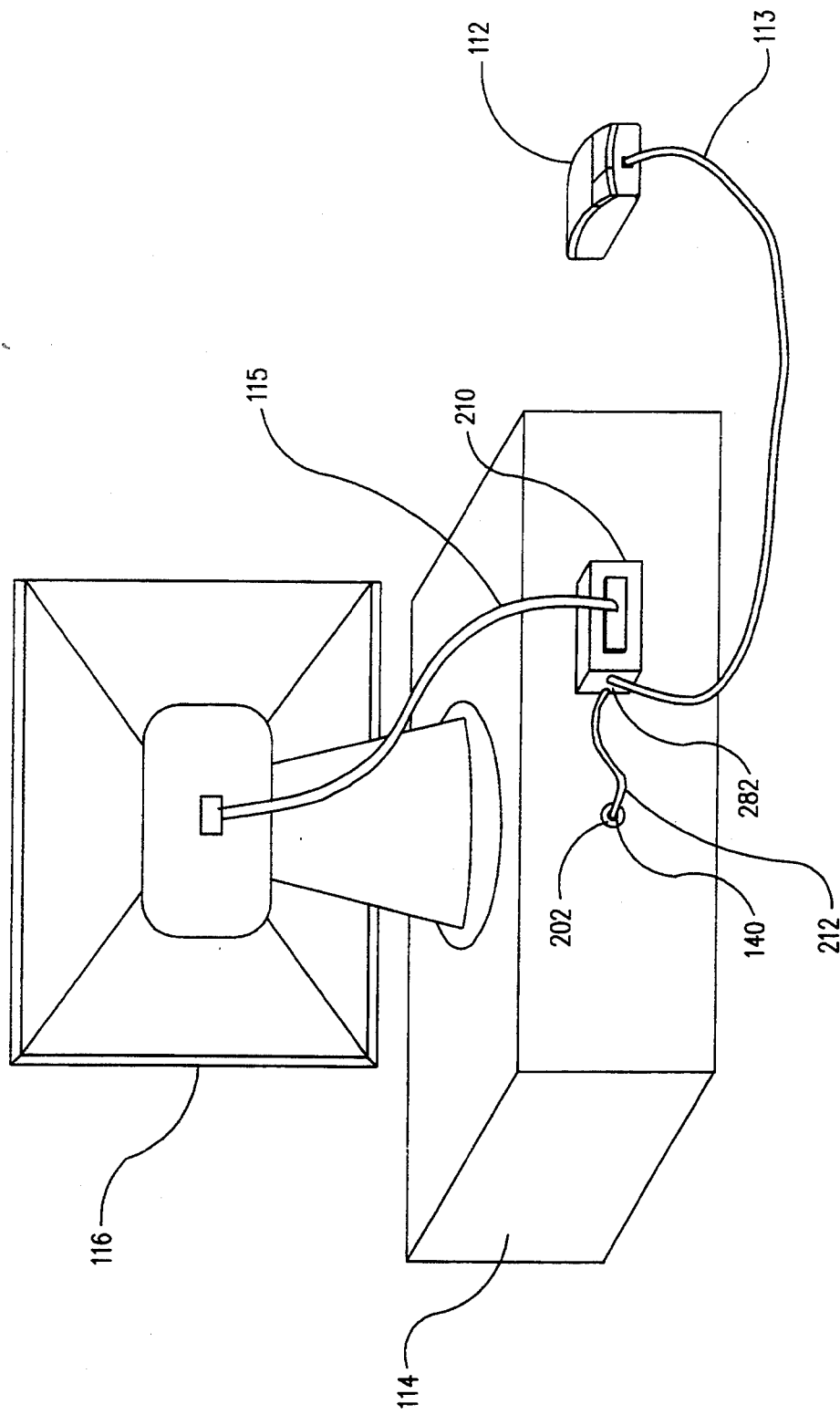
FIG. 2 is a back view of the computer system of FIGS. 1 and 1A including the monitor/mouse interface according to the preferred embodiment of the present invention.
Figure 3:
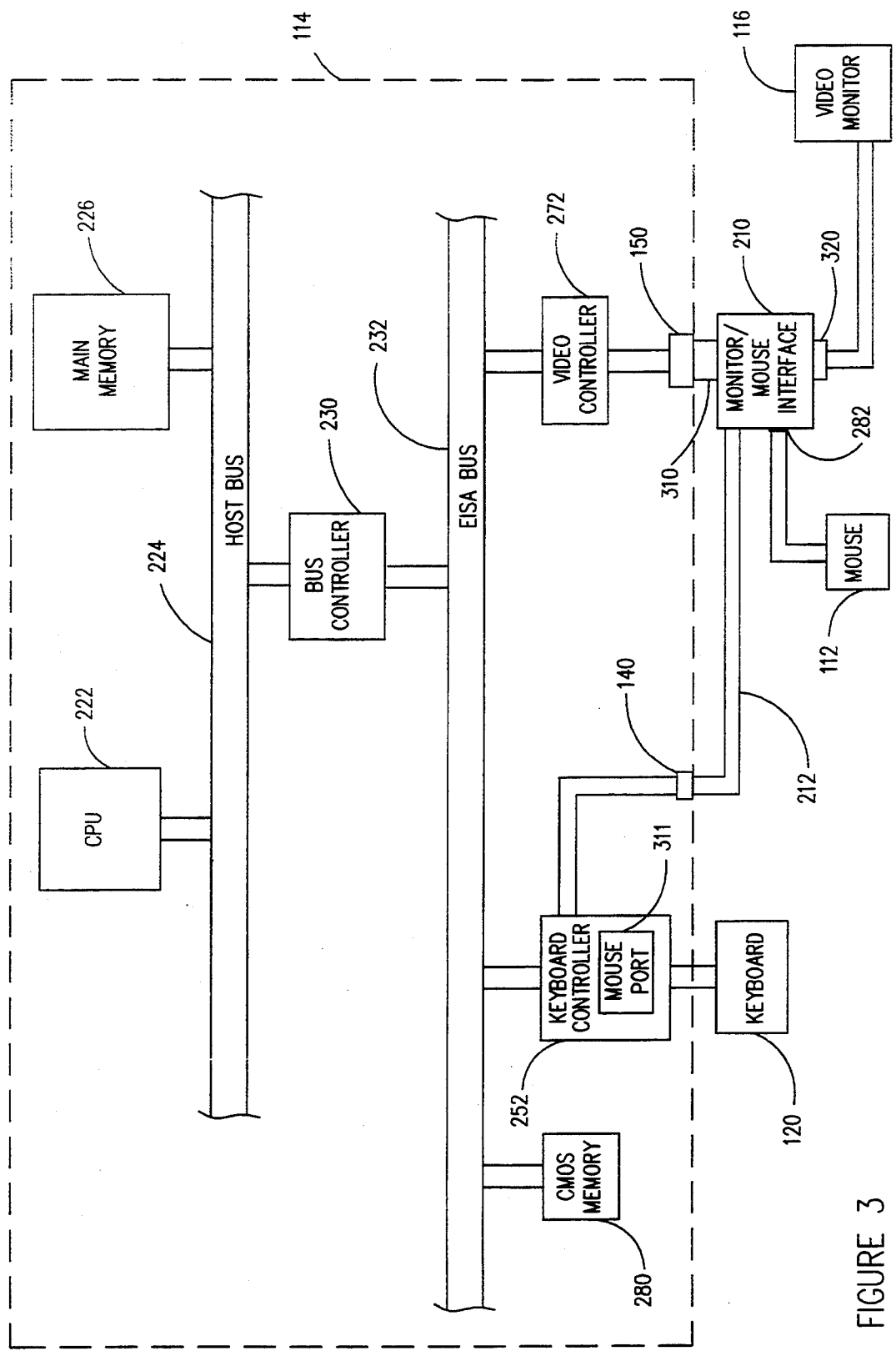
FIG. 3 is a block diagram illustrating the computer system of FIG. 2.

Referring now to FIG. 2, a back view of the computer system illustrated in FIGS. 1 and 1A and including a monitor/mouse interface 210 according to the present invention is shown. The monitor/mouse interface 210 includes a video connector 310 (FIG. 3) which is connected to the system unit video connector 150 (FIG. 1A) on the back of the system unit 114. The video connectors 150 and 310 cannot be seen in the view in FIG. 2. The monitor/mouse interface 210 includes a mouse cable 212 having a connector 202 that is connected to the system unit mouse connector 140. The monitor/mouse interface 210 includes a second video connector 320 (FIG. 3). The video cable 114 includes a connector which mates with the video connector 320 comprised on the monitor/mouse interface 210. The other end of the monitor cable 114 is connected to a connector on the video monitor 116 as shown. The monitor/mouse interface 210 also includes a "real" mouse connector 282. "Real" mouse cable 113 is connected to the real mouse connector 282 and in turn is connected to the mouse 112. The term "real" is used for the connector 282 and cable 113 to indicate that this is where the mouse 112 is actually attached, as opposed to the mouse connector 140 and mouse cable 212 which connect the system unit 114 to the monitor/mouse interface 210.

Referring now to FIG. 3, a block diagram of the computer system of FIG. 2 according to the present invention is shown. The elements of a computer system that are not important to the operation of the present invention have been omitted for simplicity. The computer system includes a CPU (central processing unit) 222 coupled to a host or memory bus 224. Main memory 226 is also coupled to the host bus 224 and stores video monitor control software, as described below. A bus controller 230 is coupled between the host bus 224 and an input/output (I/O) or expansion bus 232. In the preferred embodiment, the expansion bus 232 is preferably the extended industry standard architecture (EISA) bus 232, although various other types of expansion bus may be used. Also, the bus controller 230 is preferably the Intel 82358 EISA bus controller (EBC).

CMOS memory 280 is coupled to the expansion bus 232. The CMOS memory 280 provides non-volatile storage for video monitor control data as well as video monitor capability information, as discussed below. A keyboard controller 252 is coupled to the expansion bus 232 and in turn is coupled to the keyboard 120. The keyboard controller 252 is preferably the Intel 8042 keyboard controller produced by Intel Corporation. For more information on the 8042 keyboard controller, please see the Intel Embedded Microcontroller Manual, 1993 edition, published by Intel, which is hereby incorporated by reference. The keyboard controller 252 includes a mouse port 311 which is used to control operation of the mouse 112. The mouse port 311 is connected to the system unit mouse connector 140. A video controller 272 is connected to the expansion bus 232. The video controller 272 is also connected to the system unit video connector 150 which in turn is connected to the video connector 310 on the monitor/mouse interface 210. The monitor/mouse interface 210 is also connected to the system unit mouse connector 140. The video connector 320 on the monitor/mouse interface 210 connects to the video monitor 116. The real mouse connector 282 on the monitor/mouse interface 210 connects to the mouse 112.

Figure 4:
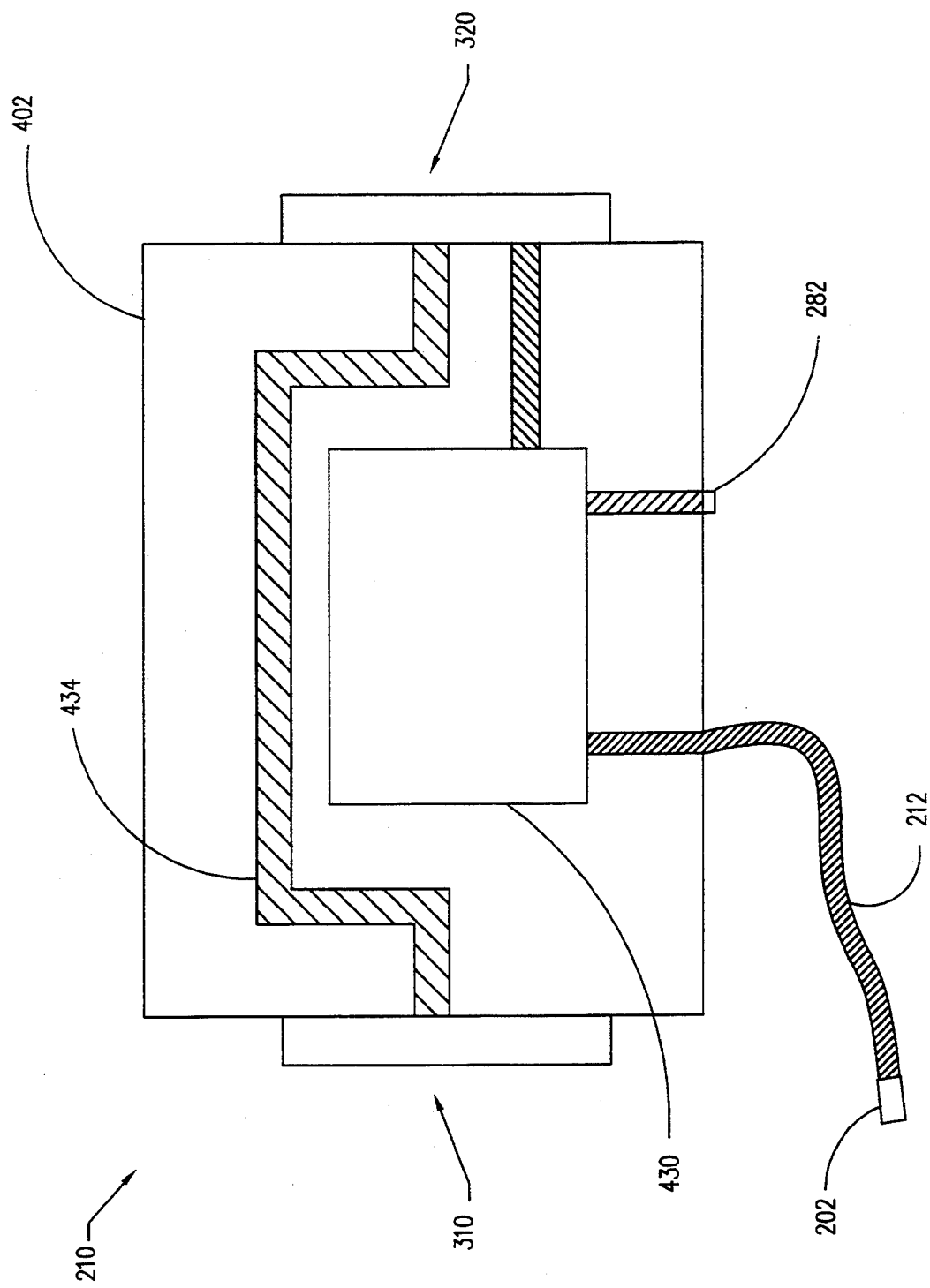
FIG. 4 illustrates the monitor/mouse interface of FIGS. 2 and 3.

Referring now to FIG. 4, a diagram illustrating the monitor/mouse interface 210 according to the preferred embodiment of the invention is shown. As shown, the video connector 310 is adapted for connecting to the system unit video connector 150 and the video connector 320 is adapted for connecting to the video monitor 116. A video path 434 is comprised within the monitor/mouse interface 210 and connects the video connector 310 to the video connector 320. Video signals are routed on the video path 434 directly between the video connectors 310 and 320. A microcontroller 430 is comprised within the monitor/mouse interface 210 and controls the operation of the interface 210. The microcontroller 430 is preferably the Intel 8051 microcontroller produced by Intel Corporation, although other controllers may of course be used. The microcontroller 430 connects to the mouse cable 212 which at one end includes mouse connector 202. The microcontroller 430 also connects to the real mouse connector 282 and to pins on the video connector 320. The microcontroller 430 preferably connects to unused pins on the video connector 320 so as not to interfere with normal video communication.

Therefore, in addition to the standard video path provided between the connectors 310 and 320, the monitor/mouse interface 210 includes a first data path between the system unit 114 and the mouse 112 and a second data path between the system unit 114 and the video monitor 116. The first data path comprises the link between the system unit 114 (FIG. 2) through mouse cable 212, microcontroller 430, real mouse connector 282, real mouse cable 113 (FIG. 2) and finally to the mouse 112 (FIG. 2). The second data path comprises the link between the system unit 114 (FIG. 2) through mouse cable 212, microcontroller 430, video connector 320, video cable 114 (FIG. 2) and video monitor 116 (FIG. 2).

Referring now to FIGS. 2–4, the microcontroller 430 acts as a signal router in that it receives CPU commands via the mouse cable 212 directing it to allow communication between either the system unit 114 and video monitor 116 or the system unit 114 and mouse 112. The CPU 222 preferably writes values through the mouse port 311 and mouse cable 212 to the microcontroller 430 in the interface 210 directing which communication path to enable. If the microcontroller 430 is commanded to provide communication between the system unit 114 and the monitor 116, then all serial communications sent along the mouse cable 212 are passed to the video monitor 116 and, in addition, serial communications from the video monitor 116 are passed through the mouse cable 212 to the system unit 114. The only exception to this is a command from the CPU 222 to the microcontroller 430 which operates to switch communication to the mouse 112. In this instance, such a communication is not provided to the video monitor 114, but rather the microcontroller 430 recognizes this command and acts to switch the data path from the video monitor 114 to the mouse 112. If the microcontroller 430 has been commanded to allow communication with the mouse 112, then all serial communication sent to the mouse port 140 is routed through the real mouse connector 282 to the mouse 112. As before, the sole exception to this is the command which switches communication from the mouse 112 to the video monitor 116.

Therefore, when communication is desired between the system unit 114 and the video monitor 116, i.e., the transfer of monitor capability information from the monitor 116 to the system unit 114 or the transfer of monitor adjustment information from the system unit 114 to the monitor 116, the CPU 222 preferably writes a value to the mouse port 311 in the keyboard controller 252 as mentioned above. This data is provided to the microcontroller 430 in the monitor/mouse interface 210 and causes the microcontroller 430 to select the data path between the system unit 114 and the video monitor 116. The system unit 114 and the video monitor 116 then communicate in this fashion. When this communication has completed, the CPU 222 writes a new value to the mouse port 311 in the keyboard controller 252, causing the monitor/mouse interface 210 to switch back to the data path between the system unit 114 and the mouse 112.

The monitor/mouse interface 210 enables bi-directional communication between the video monitor 116 and the remainder of the computer system, i.e. the system unit 114, without any hardware changes to the system unit 114. This enables the system unit 114 to adjust the functions of the video monitor 116. In addition, this enables the video monitor 116 to transmit capability information to the system unit 114 without direct user involvement. In this description, the term "direct user involvement" refers to the user having to manually input capability information into the system unit 114 or load this information using a floppy disk. No direct user involvement is required in the present invention, but rather the capability information is automatically transferred at each power-on of the system unit 114 and monitor 116. Therefore the term "direct user involvement" does not include a user merely turning on the system unit 114, which automatically operates to transfer capability information according to the present invention, but rather the act of simply turning on the system unit 114 is referred to as "indirect user involvement."

Therefore, in the preferred embodiment of the invention, bi-directional communication between the video monitor 116 and the system unit 114 is provided through the mouse port 311 (FIG. 3) in the keyboard controller 252, and the monitor/mouse interface 210 provides the switching to enable this bi-directional communication to occur while maintaining the normal function of the mouse port 311 in controlling the mouse 112. The 8042 keyboard controller 252 used in the preferred embodiment already includes commands which provide serial data to the mouse 112, and thus no firmware changes to the controller 252 are required to implement the present invention in this preferred embodiment. Also, no changes to the system unit 114 are required because the monitor/mouse interface 210 is used as the switching mechanism. Therefore, no hardware changes to the system unit 114 are required.

It is also noted that other embodiments of the invention may use other methods to provide communication between the video monitor 116 and the system unit 114. For example, other communication ports can be used, as desired. Also, U.S. patent application Ser. No. 08-119938 entitled "Method and Apparatus for Simplified Video Monitor Control" filed Sep. 10, 1993 and assigned to the same assignee as me present application discloses a method and apparatus for providing bi-directional communication between a video monitor and a system unit utilizing multiplexor logic coupled between the mouse port and each of the mouse and video monitor. For more information on this embodiment, please see the above-referenced application, which is hereby incorporated by reference.

Figure 5:
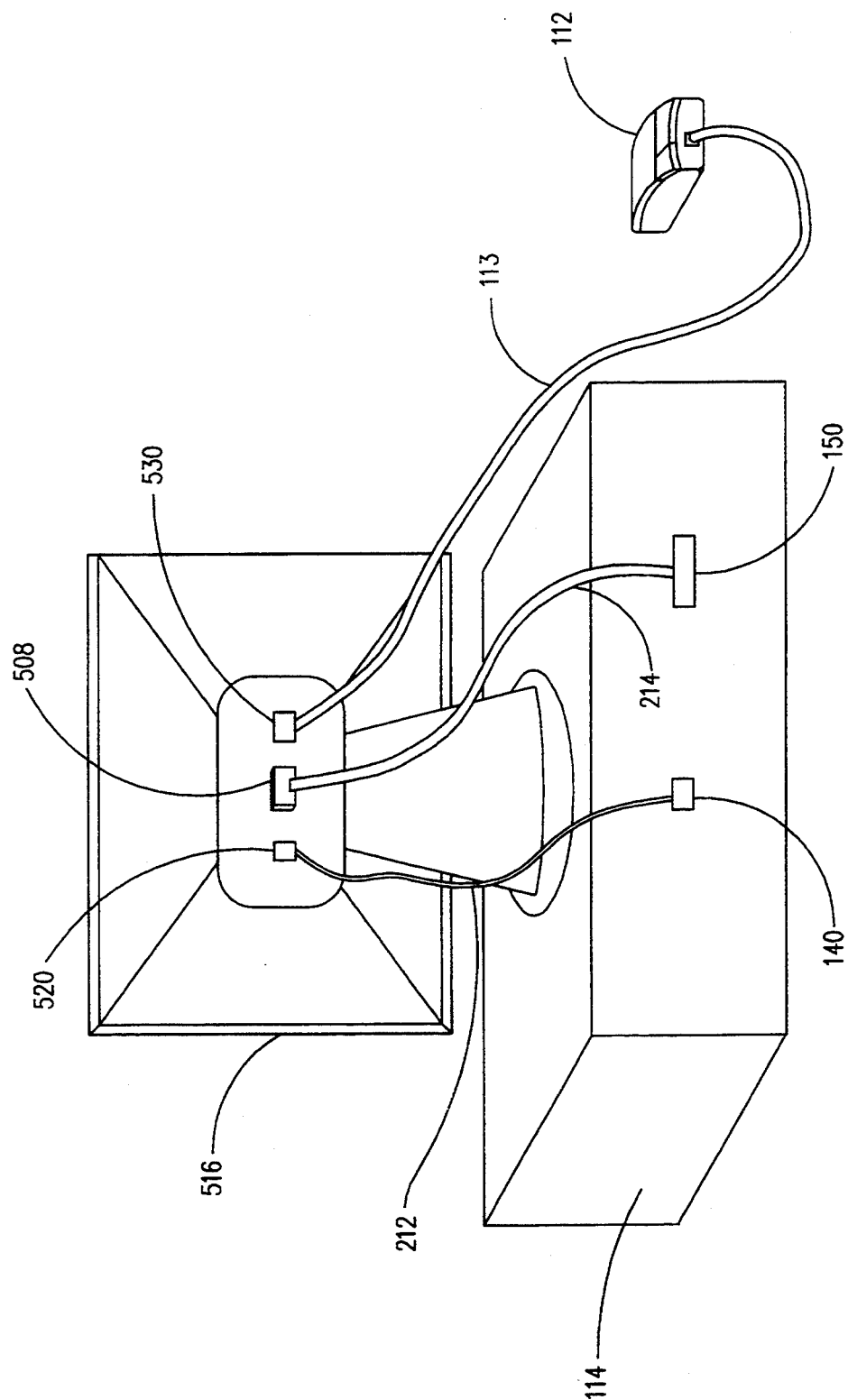
FIG. 5 is a back view of a computer system according to an alternate embodiment of the invention.

Referring now to FIG. 5, another alternate embodiment of the invention is shown. In this embodiment, the logic and connectors forming the monitor/mouse interface 210 are integrated into the video monitor 516. Preferably, the microcontroller (not shown) which is normally comprised in the video monitor 516 is used to perform the signal routing functions described above. As shown in FIG. 5, the only external changes required to the monitor 516 are the inclusion of a mouse connector 520 and a real mouse connector 530. As shown, mouse connector 140 on the back of the system unit 114 is connected to the mouse connector 520 through means of mouse cable 212. Also, video connector 150 on the back of the system unit 114 is connected to a connector 508 on the back of the video monitor 516. The monitor 516 further includes real mouse connector 530 where the user plugs in the mouse 112 using the real mouse cable 113. The embodiment shown in FIG. 5 operates similarly to that shown in FIG. 2, except that the logic comprising the monitor/mouse interface 210 is incorporated into the video monitor 516. Also, as described below, the embodiments shown in FIGS. 2 and 5 both implement the following methods to perform capability information retrieval and video monitor function control. However, the following discussion is directed to the embodiment shown in FIG. 2 for convenience.

Capability Information Retrieval

The video controller 272 can use any of the various video standards including CGA, EGA, VGA, XGA, and Super VGA, as well as others. The video monitor 116 can be any of various types and can have any of a number of resolutions and refresh frequencies. In addition, the video monitor 116 may utilize either a standard or interlaced method for drawing an image on the display screen, as desired. Therefore, the video monitor 116 can have varying capabilities, including different resolutions, interlace methods, and refresh frequencies, among others. This capability information generally must be communicated to the system unit 114 in order for the computer system to operate at its maximum efficiency. In prior art systems, direct user involvement is required, i.e., the user is required to manually input this information using either the keyboard 120 or a floppy disk each time a new monitor is installed. In the preferred embodiment of the invention, the monitor/mouse interface 210 enables the video monitor 116 to communicate this capability information directly to the system unit 114. The information is provided from the video monitor 116 through the monitor/mouse interface 210 and keyboard controller 252 to the CPU 222. The information is then stored in the CMOS memory 280. This communication of capability information is preferably performed during each power on self test (POST) of the computer system without direct user involvement. In another embodiment, this communication of capability information is only performed when a new monitor is installed.

Figure 6:
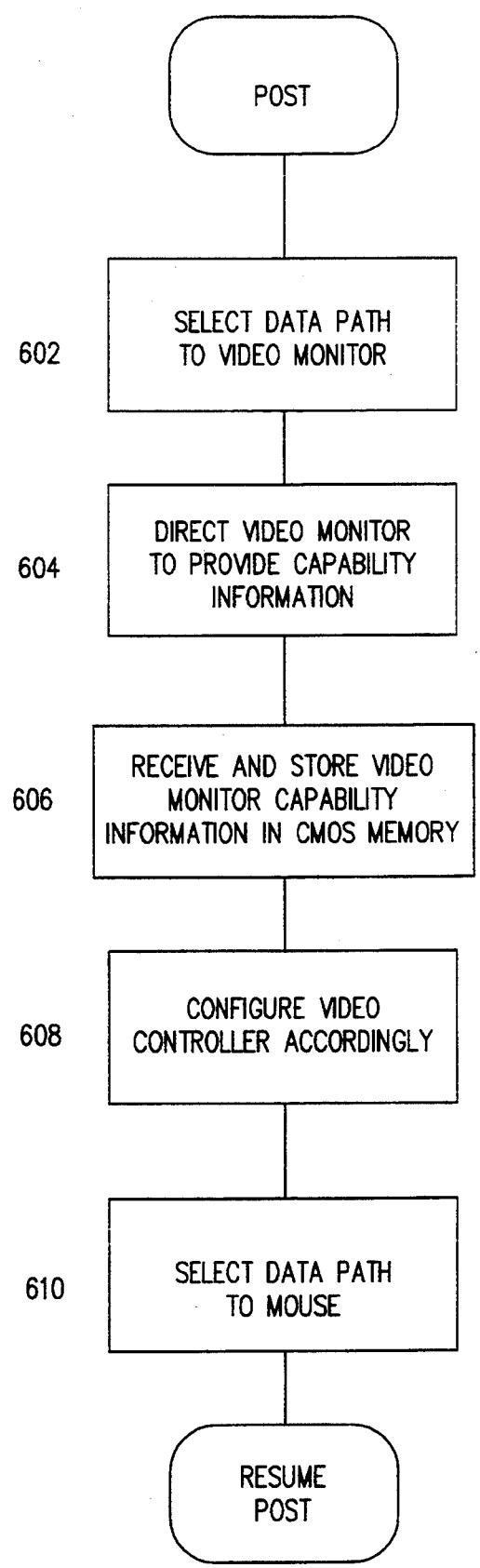
FIG. 6 is a flowchart diagram illustrating a method implemented by the system unit of FIGS. 2 and 5 directing the video monitor to provide capability information to the system unit without direct user involvement.

As mentioned above, in the preferred embodiment during each POST procedure the system unit 114 receives capability information from the video monitor 116. FIG. 6 illustrates a portion of the POST procedure which performs this function. However, it is noted that this function can be performed at a time other than performance of the POST. For example, in one embodiment the capability information retrieval method is performed by a terminate and stay resident (TSR) program that executes after the POST has completed. The period of time during or immediately after the POST but before application programs begin execution is referred to in this specification as "power-on" of the computer system.

Referring now to FIG. 6, in step 602 the CPU 222 in the system unit 114 writes a value to the mouse port 311 in the keyboard controller 252 directing the monitor/mouse interface 210 to select the data path to the video monitor 116. In step 604 the CPU 222 then provides a value through the keyboard controller 252 and monitor/mouse interface 210 to the video monitor 116 directing the video monitor 116 to provide its capability information. Controller logic (not shown) in the video monitor 116 preferably provides the video monitor capability information to the system unit 114. The controller logic outputs this capability information through the monitor/mouse interface 210 and keyboard controller 252, and this information is received by the CPU 222 in step 606. This information is also preferably stored in the CMOS memory 280 in step 606. In step 608 the CPU 22 configures the video controller 272 accordingly. When the system unit 114 and the video monitor have finished communicating, then the monitor/mouse interface 210 is directed to select the data path to the mouse 112 in step 610, and thus the mouse 112 receives information from the mouse port 311 in the keyboard controller 252 as would normally occur. Therefore, the video monitor 116 provides capability information to the system unit 114 without direct user involvement. This is done automatically during each POST, and thus no direct user involvement is required no matter how many times a new monitor is installed.

Video Monitor Function Control

The video monitor 116 also includes logic for controlling the display that a user sees. For example, in one embodiment the video monitor 116 includes horizontal and vertical size control logic, horizontal and vertical position control logic, PCC amp and phase control logic, key and pin balance control logic, color balance control logic, brightness and contrast control logic, and power control logic. Since this logic is standard and is well known to those skilled in the art, details of the operation of this logic are omitted for simplicity. In prior art video monitors these features are varied by controls or knobs provided on the video monitor 116, and the user adjusts the various controls or knobs to adjust the visual image output from the monitor 116. These controls are expensive and are many times very difficult to use. In addition, these controls require non-volatile memory in the monitor 116 to remember the settings between power cycles, which adds to the cost of the monitor 116. In the preferred embodiment of the invention, the video monitor 116 does not include any external controls or knobs, but rather monitor control software preferably stored in main memory 226 of the system unit 114 enables a user to easily adjust or control the functions of the video monitor 116.

Figure 7:
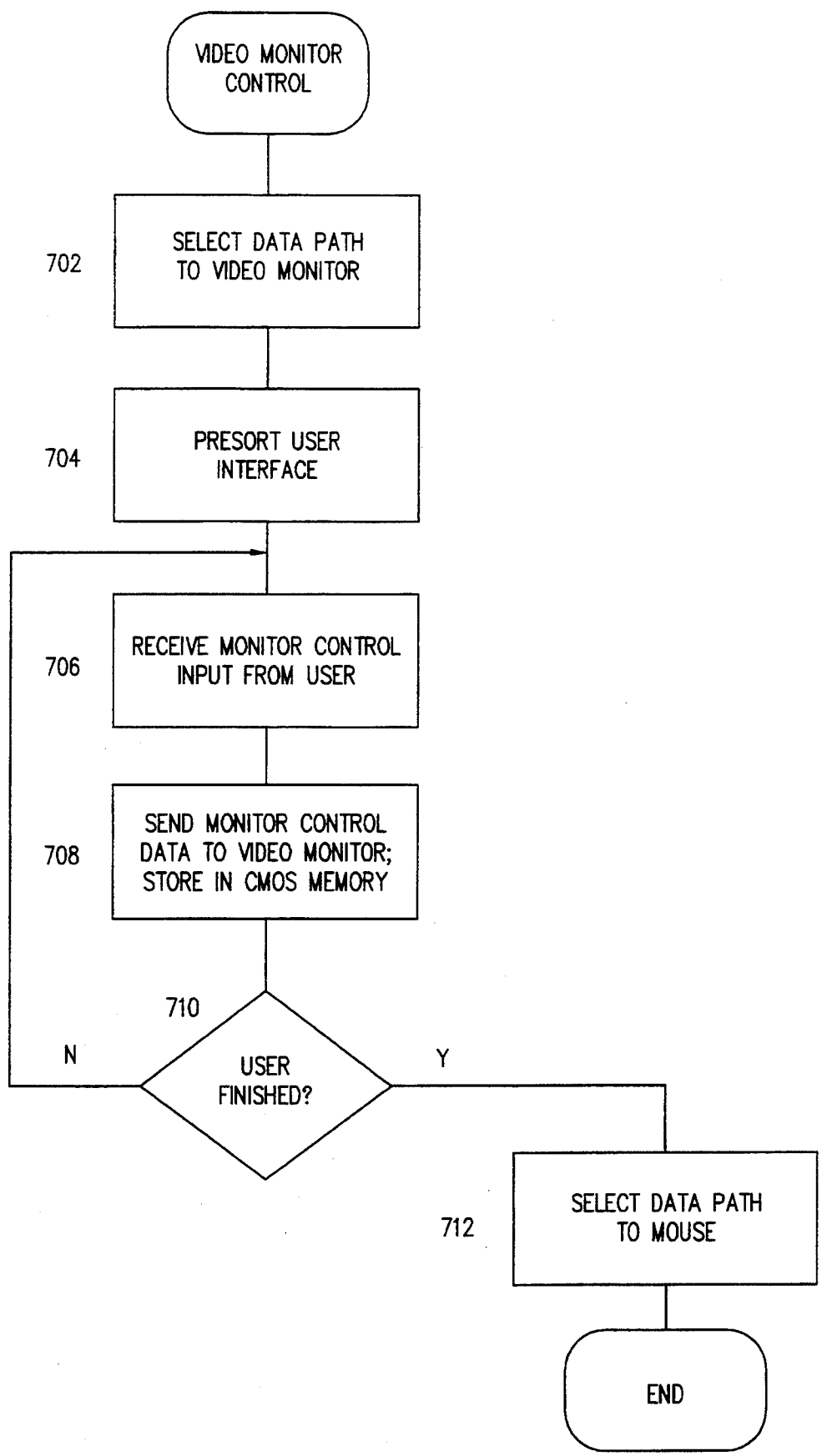
FIG. 7 is a flowchart diagram illustrating a method implemented by the system unit of FIGS. 2 and 5 to control the functions of the video monitor.

Referring now to FIG. 7, when a user desires to adjust the output of the video monitor 116, the monitor control software is executed by the CPU 222 and the following operations occur. First, in step 702 a value is written to the mouse port 305 directing the monitor/mouse interface 210 to select the data path to the video monitor 116. This enables the CPU 222 in the system unit 114 to communicate the user selection information to the video monitor 116. The system unit 114 then presents a video monitor control user interface onto the monitor display screen in step 704. Since the manner in which a user interface is generated is well known in the art, details of its generation are omitted for simplicity. The user interface preferably includes a plurality of visual buttons, knobs, slide controls, etc. with corresponding titles to enable a user to easily adjust the monitor's visual output. The user can then use either the mouse 112 or keyboard 120 to make selections on the user interface to adjust or change the visual display of the video monitor 116. For example, the user can change the horizontal and vertical size or position, color balance, contrast etc. as desired. As the user makes selections in the interface to adjust the monitor 116, the resultant video monitor control data is received by the system unit 114 in step 706.

In step 708 the CPU 222 writes this data to the mouse port 311 in the keyboard controller 252, and this data is provided through the monitor/mouse interface 210 to the video monitor 116. This data is used by the display control logic in the monitor 116 to adjust the output of the monitor 116 accordingly. The video monitor control data is also stored in the CMOS memory 280 in step 708. The monitor control software continues to loop through steps 706 and 708 while the user is inputting data to adjust the monitor's visual output. When the user is determined to have completed adjusting the monitor 116 in step 710, the CPU 222 in step 712 writes a value to the mouse port 305 directing the monitor/mouse interface 210 to select the path to the mouse 112. It is noted that the keyboard 120 is preferably used here for user input because, if the mouse 112 is used as the input, each transmission of monitor control data to the video monitor 116 requires switching the data path from the mouse 112 to the video monitor 116 and then back again for more user input.

Therefore, a bi-directional communication method and apparatus between a video monitor and system unit in a computer system is shown. In one embodiment, a monitor/mouse interface is included to provide the data path switching mechanism. In a second embodiment, the logic comprising the monitor/mouse interface is incorporated into the video monitor. This bi-directional communication can be performed with no hardware modifications to the system unit 114. The bi-directional communication allows the system unit to control all of the standard functions of a video monitor and also enables the system unit 114 to receive monitor capability information from the video monitor without requiring direct user involvement.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer system having simplified video monitor capability information retrieval abilities, comprising:
   a system unit, wherein said system unit comprises:
      a video connector; and
      a data connector;
   a video monitor storing video monitor capability information; and
   a monitor interface having a first connector arranged for connection with said system unit video connector, said monitor interface having a second connector arranged for connection to said video monitor, and a third connector arranged for connection to said system unit data connector,
   wherein said monitor interface includes a first path between said first and second connectors, and a second path between said second and third connectors, said monitor interface being arranged for connecting said system unit and said video monitor, wherein said monitor interface receives video monitor capability information from said video monitor and provides said video monitor capability information to said system unit using said second path, wherein said computer system further comprises non-volatile memory separate from said video monitor, said non-volatile memory being arranged for receiving and storing said video monitor capability information.

2. The computer system of claim 1, wherein said video monitor transmits said video monitor capability information through said monitor interface to said system unit without direct user involvement.

3. The computer system of claim 2, wherein said video monitor transmits said video monitor capability information through said monitor interface to said system unit during power-on of the computer system.

4. The computer system of claim 1, wherein said monitor interface further includes a fourth connector for connecting to a peripheral device;
the computer system further comprising a peripheral device coupled to said monitor interface fourth connector;
wherein said system unit data connector comprises a peripheral device connector;
wherein said monitor interface further includes a third path between said third connector and said fourth connector;
wherein said monitor interface selects said second path to enable transmission of said video monitor capability information to said system unit.

5. The computer system of claim 4, wherein said peripheral device is a mouse.

6. The computer system of claim 4, wherein said monitor interface includes a controller coupled to said second, third and fourth connectors.

7. The computer system of claim 4, the system unit further including a CPU coupled to said data connector, wherein said CPU generates a signal to said monitor interface to select either of said first or second paths.

8. The computer system of claim 7, the system unit further including a video controller coupled to said CPU, wherein said CPU configures said video controller using said video monitor capability information.

9. A method for obtaining video monitor capability information without direct user involvement in a computer system comprising a system unit including a CPU and non-volatile memory, the computer system also including a video monitor and a monitor interface, said monitor interface being coupled between the system unit and the video monitor, wherein the video monitor includes capability information, the method comprising the steps of:
the system unit directing the video monitor to provide the capability information to the system unit without direct user involvement;
the video monitor providing the capability information to the system unit; and
the system unit storing the capability information in the non-volatile memory.

10. The method of claim 9, wherein the monitor interface includes a video path connecting the system unit to the video monitor and a data path connecting the system unit to the video monitor, the method further comprising:
the monitor interface selecting said data path to the video monitor prior to said step of directing.

11. The method of claim 9, wherein the system unit includes a video controller which is coupled to the CPU, the method further comprising:
the CPU configuring the video controller according to said capability information after said step of providing.

12. A computer system having simplified video monitor control, comprising:
a video monitor including visual output control logic for controlling the visual output of the video monitor;
an input device for entering data into the computer system;
a system unit coupled to said input device and said video monitor, wherein said system unit comprises:
a memory for storing monitor control software; and
a CPU coupled to said memory, said CPU being operable to execute said monitor control software to enable a user to use said input device to input monitor control data to said CPU to adjust said visual output of said video monitor;
a monitor interface coupled between said CPU and said video monitor which receives said monitor control data from said CPU and provides said monitor control data to said video monitor visual output control logic;
wherein said visual output control logic adjusts the visual output of said video monitor using said monitor control data.

13. The computer system of claim 12, wherein when said CPU executes said monitor control software, said CPU being operable to generate visual output control Signals effecting the presentation of a user interface on said video monitor; and
wherein said input device enables a user to make selections on said user interface to enter said monitor control data and adjust said visual output of said video monitor.

14. The computer system of claim 12, said system unit further comprising:
non-volatile memory coupled to said CPU for storing said monitor control data.

15. A method for simplified video monitor control in a computer system comprising a system unit including a CPU, memory capable of storing monitor control software, and non-volatile memory, the computer system also including a monitor interface coupled to the system unit, a video monitor coupled to the monitor interface, and an input device coupled to the system unit, wherein the video monitor includes logic for controlling the visual output of the video monitor, the method comprising the steps of:
a user entering monitor control data using the input device;
the system unit receiving the monitor control data from the input device;
the system unit providing the monitor control data through the monitor interface to the video monitor; and
the video monitor adjusting its visual output according to said monitor control data.

16. The method of claim 15, wherein the monitor interface includes a video path connecting the system unit to the video monitor and a data path connecting the system unit to the video monitor, the method further comprising:
the system unit selecting the data path to the video monitor prior to said step of providing.

17. The method of claim 15, further comprising:
the CPU storing said monitor control data in said non-volatile memory after said step of receiving.

18. An apparatus which provides bi-directional communication between a system unit and a video monitor in a computer system, wherein the computer system comprises a system unit and a video monitor coupled to said system unit, said video monitor being operable for storing video monitor capability information, the apparatus comprising:

a monitor interface coupled between said system unit and said video monitor, said monitor interface being adapted for transmitting said video monitor capability information from said video monitor to said system unit, said system unit further including non-volatile memory for storing the video monitor capability information.

19. The apparatus of claim 18, wherein the monitor interface includes a video path connecting the system unit to the video monitor and a data path connecting the system unit to the video monitor;

wherein the monitor interface selects the data path to the video monitor to transmit said video monitor capability information from said video monitor to said system unit.

20. A computer system having simplified video monitor capability information retrieval abilities, comprising:

a system unit, wherein said system unit comprises:
   a video connector; and
   a peripheral device connector;
a video monitor storing video monitor capability information;
a peripheral device; and
a monitor-peripheral device interface having a first video connector mating with said system unit video connector, said interface further including:
   a first peripheral device connector mating with said system unit peripheral device connector,
   a second video connector connected to said video monitor, and
   a second peripheral device connector connecting to said peripheral device,
wherein said monitor-peripheral device interface includes a first data path between said first peripheral device connector and said second peripheral device connector, said interface further including a second data path between said first peripheral device connector and said second video connector, wherein said monitor-peripheral device interface receives video monitor capability information from said video monitor and provides said video monitor capability information to said system unit using said second data path without direct user involvement.

21. A computer system having simplified video monitor capability information retrieval abilities, comprising:

a system unit, wherein said system unit comprises:
   a video connector; and
   a data connector;
a video monitor storing video monitor capability information, said video monitor having a video monitor connector arranged for connection with said system unit video connector thereby forming a video path, said video monitor further including a video monitor data connector connecting to said system unit data connector thereby forming a data path;

said system unit further including non-volatile memory for storing the video monitor capability information;

wherein said video monitor provides video monitor capability information to said non-volatile memory using said data path.

22. The computer system of claim 21, wherein said video monitor transmits said video monitor capability information to said system unit without direct user involvement.

23. The computer system of claim 22, wherein said video monitor transmits said video monitor capability information to said system unit during power-on of the computer system.

24. The computer system of claim 21, wherein said video monitor further includes a peripheral device connector for connecting to a peripheral device;

the computer system further comprising a peripheral device coupled to said video monitor peripheral device connector;

wherein said system unit data connector comprises a peripheral device connector;

wherein said video monitor further includes a first data path between said system unit peripheral device connector and said peripheral device and a second data path connecting said system unit peripheral device connector and said video monitor;

p1 wherein said video monitor selects said second data path to enable transmission of said video monitor capability information to said system unit.

25. The computer system of claim 24, wherein said peripheral device is a mouse.

26. A computer system having simplified video monitor control, comprising:

an input device for entering data into the computer system;

a system unit coupled to said input device, wherein said system unit comprises:
   memory for storing monitor control software;
   a CPU coupled to said memory, said CPU being operable to execute said monitor control software to enable a user to use said input device to input monitor control data to said CPU to adjust said visual output of said video monitor;
the computer system further including a video monitor coupled to said system unit, said video monitor including
   visual output control logic for controlling the visual output of the video monitor, said video monitor being arranged to receive said monitor control data from said CPU and adjust the visual output of said video monitor using said monitor control data.

* * * * *